United States Patent Office 2,862,942
Patented Dec. 2, 1958

2,862,942

METHOD OF OXIDIZING AND CLEAVING COMPOUNDS TO FORM ACIDIC PRODUCTS

Jordan P. Snyder, Philadelphia, Pa.

No Drawing. Application October 1, 1957
Serial No. 687,592

46 Claims. (Cl. 260—413)

This invention deals with the oxidative cleavage of organic compounds which are subject to attack by nitric acid or the oxidizing nitric oxides. Such organic compounds include the mono-olefins and poly-olefins, the alcohols and similar hydroxy organic compounds, ketones and similar organic compounds having a ketonic group, and the paraffins such as the acyclic paraffins, cycloparaffins, alkyl-aromatic organic compounds, cycloalkyl-aromatic substances, and other substituted acyclic, heterocyclic and cyclic paraffins.

More particularly, the invention concerns a method of oxidizing and cleaving such organic compounds to form monobasic and/or dibasic acids.

While organic compounds as defined herein have heretofore been oxidized with nitric acid to produce acidic scission products, the yields have been low, the process prolonged, and a considerable amount of residual uncleaved compounds has been obtained. Such residual uncleaved compounds are quite resistant to further oxidation and are considered worthless.

In nitric acid oxidation according to conventional practice, polyolefinic acids give poorer yields than does a mono-olefinic acid such as oleic acid or the like. Furthermore, the products of all such nitric acid oxidation reactions are generally contaminated with nitrogen-containing substances that are difficult to remove and cause an intense color formation on heating the products, thus diminishing their value and applicability.

Other methods for the cleavage of olefins and polyolefins are known but are much more costly, time-consuming or involve a series of complicated reactions that make many of these methods impracticable commercially. The mehod involving nitric acid oxidation and cleavage thus is of great economic interest and much work has been done in industrial chemical laboratories to solve the aforementioned problems with little or no success.

While hydroxy acids such as 9,10 dihydroxystearic acid and 12-hydroxy stearic acid have been heretofore oxidized with nitric acid to produce acidic scission products the yields have been low, the process prolonged and a considerable amount of residual, uncleaved material has been obtained. Such residual materials are thermally unstable, are dark and odorous and have been considered worthless. Furthermore, such residual materials are hazardous to further process since such material tends to decompose vigorously and exothermically. Furthermore, the products of all such nitric acid oxidations are generally contaminated with nitrogen-containing substances that are difficult to remove and that cause an intense color formation on heating the products thus diminishing their value and applicability.

Other methods for the cleavage of hydroxy and keto containing compounds are known but are much more costly, time consuming or involve a series of complicated reactions that make many of these methods impracticable. The method involving nitric acid oxidation and cleavage thus is of great economic interest and much work has been done in industrial chemical laboratories to solve the aforementioned problems with little or no success.

It is a primary object of this invention to provide a new method for oxidizing organic compounds, producing improved products in increased yields.

This invention has as an object the provision of an improved process for the oxidative scission of mono-olefins and polyolefins, hereinafter generically referred to as olefins, and more particularly of mono-olefinic or polyolefinic acids, hereinafter generically referred to as olefin acids or simply as olefins. Another object is to provide an improved process for the production of monobasic acids and/or polybasic acids from an olefin acid. A further object is to provide an improvement in the nitric acid oxidation of the mono-olefins and polyolefins. A still further object of the invention is to produce monobasic and polybasic acids of the character indicated, having improved color stability. Another object is to provide a method for separating saturated organic substances from unsaturated substances, or to remove the unsaturation in mixtures of saturated and unsaturated substances.

This invention has as another object the provision of an improved process for the oxidation scission of hydroxy and ketonic aliphatic and cycloaliphatic substances. Another object is to provide an improved process for the production of monobasic acids and/or polybasic acids from a hydroxy or keto acid. A further objective is to provide an improvement in the nitric acid oxidation of certain hydroxy or keto acids. A still further objective is to produce monobasic and polybasic acids of the character indicated having improved color stability. Another objective is to provide a method of separating saturated organic substances from hydroxy or ketonic substances. Another objective is to render the processing of large amounts of the residue from such nitric acid oxidations more economical and less subject to hazard.

This invention has as another object the provision of an improved process for the oxidation of acyclic aliphatic, cycloaliphatic, alkyl-aryl or alkyl-heterocyclic substances. Another object is to oxidize an alkyl group attached to an aromatic ring to form the corresponding acid. Another object is to provide an improved process for the production of monobasic or polybasic acids from the above substances. A further objective is to provide an improvement in the nitric acid oxidation of these substances. A still further objective is to produce monobasic or polybasic acids of the character indicated having improved color stability. Another objective is to render the processing of large amounts of the residue from such nitric acid oxidations more economical and less subject to hazard. Still other objects and advantages of this invention will appear hereinafter.

The foregoing and other objects of the invention are accomplished by my method wherein an organic compound of the character indicated is treated with a nitric oxidizing agent such as nitric acid or nitric oxides, for example, the oxidized products are mixed with alkali, preferably in excess, and the alkaline material is reacted with an acidic oxidizing agent, preferably in excess, to form the acidic cleavage products.

Preferably the invention is practiced by mixing together the organic compound and nitric acid or nitric oxides, heating the mixture to about 30–250° C. for up to 20 hours to accomplish the initial oxidation, separating the nitrogen-containing oil thus produced, if desired, mixing with an excess of strong alkali such as sodium hydroxide, potassium hydroxide or other caustic alkali such as sodium carbonate, potassium carbonate, sodium alcoholate or metallic sodium, heating this mixture to about 30–130° C. for up to 20 hours and then reoxidizing with a suitable oxidizing agent such as chromic acid or hot sulfuric acid as well as nitric acid or the oxidizing nitric oxides. The reoxidation step may be carried out by means of an alkaline oxidizing agent such as alkaline permanganate or hot alkali hypochlorite in the presence of suitable catalysts provided the alkaline nitrogen-containing oil is acidified prior to the introduction of such an oxidizing agent.

The reaction mechanism or mechanisms of the process are not fully apparent but following this sequence of steps will produce an improved yield of cleavage products and will result in the advantages hereinto mentioned.

In effecting the oxidation and cleavage of an olefin the invention is preferably practiced by adding the olefin starting material to nitric acid, heating the mixture to about 20–130° C. for up to nine hours to accomplish oxidation of the olefin, separating the nitrogen-containing oil thus produced, if desired, adding an excess of strong alkali such as NaOH, KOH, or other caustic alkali such as $Na_2CO_3$, $K_2CO_3$, or metallic Na which are known to produce aci-salts, heating this mixture at about 30–130° C. for up to nine hours, and then reoxidizing with any suitable oxidizing agent such as chromic acid or hot sulfuric acid as well as nitric acid or the oxidizing nitric oxides. The reoxidation step may also be carried out by means of an alkaline oxidizing agent such as an alkali metal permanganate or hot alkali hypochlorite in the presence of suitable catalysts provided the alkaline nitrogen-containing oil is acidified prior to introduction of the oxidizing agent.

While the reaction mechanism of the process is not fully apparent, it is believed that in the initial oxidation step the nitric acid attacks the doubly bound carbon atoms of the olefin in the following manner:

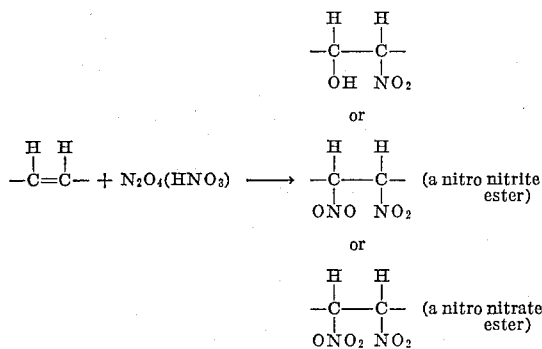

These products then react with the alkali solution in accordance with the invention, to produce aci-salts of the character:

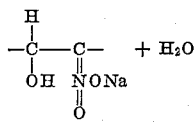

The aci-salts produced are then converted to hydroxy-aldehydes or hydroxy-ketones by reason of the action of the nitric acid or acid used in the reoxidation or second oxidation step of the process. Such hydroxy-aldehydes and hydroxy-ketones have formulas of the following type, X being any radical:

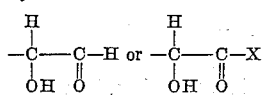

The action of the oxidizing agent then causes a scission or cleavage of the molecule, and the cleavage products are themselves oxidized to produce acidic cleavage products.

Such reaction may be illustrated, for example, as it is applied to oleic acid.

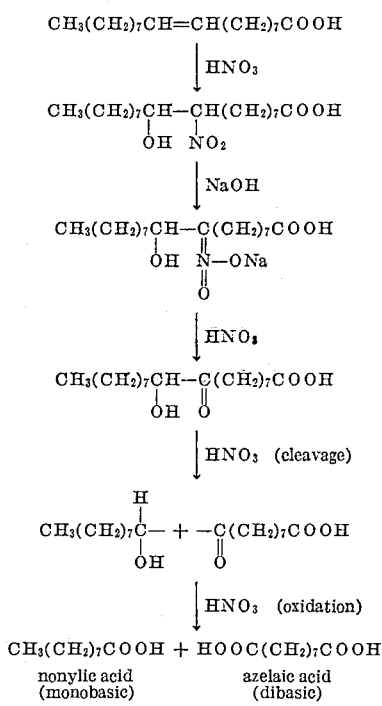

It will be appreciated that similar steps may occur in the application of the process to other unsaturated acids including the polyolefinic acids, as well as to other olefins, the reaction mechanism possibly being the same and the nature of the products obtained being dependent upon the chemical nature of the inert portions of unsaturated starting material and the number and location of the doubly bonded carbon atoms present. Yet it is to be emphasized that some of the olefins are not cleaved particularly readily in accordance with my process, such olefins being those wherein no olefinic carbon atom carries a hydrogen atom. Accordingly, the invention is applicable generally to the olefins wherein at least one hydrogen atom is carried by an olefinic carbon atom, such structure being necessary to yield an aci-salt of the character indicated.

The same method steps may be followed in oxidizing and cleaving the alcohols and ketones and in oxidizing the paraffins and related organic compounds as well.

The more detailed operation of my invention is illustrated by the following examples, wherein parts are given by weight unless otherwise stated. There are of course, many forms of this invention obvious to one skilled in the chemical art once the invention has been revealed and it will accordingly be understood that these examples are illustrative and not used in a limiting sense.

*Example 1*

282 grams of commercial oleic acid were gradually added to 2000 grams of hot 68% nitric acid with good agitation. The mixture was heated to 100° C. and the heating continued for a total time of one hour. Nitric oxides were evolved. The solution was then vacuum concentrated to dryness, the residue taken up in 250 cc. chloroform and all solids crystallized out. The solid product was filtered and dried. 50.6 g. of white crystalline dibasic acids were thus obtained.

The chloroform was distilled, leaving a residual oil. The residual oil was added to a hot solution consisting of 240 grams of sodium hydroxide dissolved in 500 cc. of water. The solution was heated and maintained at 80–85° C. for one hour and the alkaline material resulting was reoxidized by gradual addition to 2948 g. of hot nitric acid with good agitation. The acid solution was heated to 100° C. for one hour, forming a supernatant oil which was separated from the solution. The excess nitric acid was removed from the solution by evaporation to dryness under vacuum. The residue of such evaporation was crystallized from 450 cc. of water and the resulting solid was filtered and dried. The dry residue, almost white, was taken up in 200 cc. of chloroform and recrystallized therefrom, producing 55.6 g. of white, crystalline dibasic acids. Thus, the total yield of dibasic acids was 106.2 grams.

The chloroform solution from the recrystallization of the dibasic acids was distilled to remove the chloroform, leaving a residual oil which was added to the supernatant oil separated from the reoxidation product. This mixture was vacuum distilled and 82.2 g. of relatively short chained monobasic acids, boiling at 128–169° C. (at 32 mm.), were obtained. Continued distillation of the residue gave 40.0 g. of longer-chained monobasic acids boiling at 190–252° C., at 29 mm.

Thus a total of 122.2 grams monobasic acids and 106.2 grams dibasic acids, or 228.4 grams acidic oxidative cleavage product, was obtained. Based upon an initial charge of 282 grams oleic acid, the yield was 80.9%, and the product was characterized by improved color stability when subjected to heating.

*Example 2*

The nitric oxides evolved from the oxidation of 282 g. of commercial oleic acid with 2000 grams of hot nitric acid (as in Example 1) were passed into 72 grams of commercial oleic acid dissolved in 200 cc. of hexane, with cooling and stirring. The hexane was then distilled off leaving a residual oil which was found to be partially saturated, and to have an appreciable nitrogen content. This oil was added to 1000 g. of hot nitric acid and stirred for one hour, the nitric acid was distilled under reduced pressure, and the residual oil was added to a solution consisting of 120 grams sodium hydroxide dissolved in 500 cc. water. The resulting solution was heated to 80–85° C. and maintained at this temperature for one hour. The solution was then heated with 1474 grams of hot nitric acid for one hour and processed as indicated in Example 1.

The yield of dibasic acids was 15.0 grams while the yield of short-chained monobasic acids was 10.0 grams. The total yield of oxidative cleavage products was 25.0 grams, or 34.7%.

*Example 3*

282 grams of linseed-oil acids consisting essentially of linoleic and linolenic acids were oxidized following the procedure described in connection with oleic acid in Example 1. The initial crop of dibasic acids produced was fairly soft and impure even after recrystallization from water and from chloroform. The yield of dibasic acids was 45.5 grams. The oily layers were dissolved in a solution consisting of 320 grams of sodium hydroxide in 600 cc. of water, heated at 80–85° C. for one hour and reoxidized with 2900 g. of nitric acid. The mixture was then processed in the manner described in Example 1 to give a total yield of 104 grams of dibasic acids. Distillation of the residual oily layer gave 20.0 grams of short-chained monobasic acids boiling at 70–110° C. at 25 mm.

*Example 4*

The following example is illustrative of the inadequate results attained in accordance with a direct oxidation process. 282 grams of commercial oleic acid were gradually added to 2000 grams of hot 68% nitric acid with good agitation and the heating was continued for a total time of three hours. The solution was then vacuum concentrated to dryness, the residue taken up in 250 cc. of chloroform, and solids were crystallized out of the chloroform solution. 84 g. of white, crystalline dibasic acids were obtained upon filtering and drying.

The chloroform solution was distilled to remove the solvent and the residual oil was vacuum-distilled. 60 grams of shorter-chained fatty acids boiling at 90–122° C. at 3 mm. were obtained. The residue in the distillation flask was a black semi-solid tar. The yield from 282 grams oleic acid was 144 grams total oxidized acids or a yield of 51.1%.

*Example 5*

Another batch of oleic acid was treated as described in Example 4.

The residual acids remaining in chloroform solution after crystallization of the dibasic acids therefrom were separated from the chloroform by distillation. The resulting acids (in the form of oils) were heated to about 120° C. A vigorous, exothermic reaction began and the product rapidly resinified to a black, tarry mass. The recovery of monobasic acids on distillation was 40 grams.

*Example 6*

Another batch of oleic acid was treated as described in Example 1.

The residual acids remaining after crystallization of the dibasic acids from the oxidation product was heated to 120° C. No decomposition occurred and the mixture distilled smoothly to give 72 g. of light colored, monobasic acids.

While the above examples show the oxidation of oleic, linoleic and linolenic acids, the process is applicable to the oxidation of olefins and polyolefins generally, wherein a hydrogen atom is attached to at least one of the olefinic carbon atoms. Thus, the invention is applicable not only to doubly-bonded substances such as oleic acid, elaidic acid, erucic acid, undecylenic acid, cyclohexene, terpenes containing only one double bond, isooleic acid and other olefins containing additional substituents such as ricinoleic acid, oleic nitrile, glyceryl oleate and oleyl chloride but is also applicable to polyunsaturated substances such as linoleic acid, linolenic acid, fish-oil acids, eleostearic acid, polyolefinic terpenes, rosin acids and polyolefins containing other substituents such as the nitrile, amide, halide, etc. group. Furthermore, the pure substances need not be employed but either natural or synthetic mixtures of these olefins and/or polyolefins or relatively inert ingredients may be employed.

Partially modified or altered olefins and/or polyolefins such as partially sulfated or "blown" fatty acids or oils are considered to fall within the scope of this invention.

*Example 7*

316 grams (1 mol) of the low-melting isomer of 9, 10 dihydroxystearic acid

was added gradually to 2000 grams of hot, 69% nitric acid with good agitation. The oxidation mixture was heated and stirred for two hours, cooled to 45° C. and a supernatant oil was separated from the nitric acid solution. The nitric acid solution was vacuum distilled to dryness, the residue was crystallized from 150 cc. of chloroform and 86 grams of a white, crystalline solid were obtained. Its acid number was 586 as compared with 596 which is theory for azelaic acid.

The oil layer was treated with water to remove nitric acid and then vacuum distilled. 40 grams of a short-chained, monobasic acid (nonylic acid) were obtained with a boiling point of 138–58° C. at 34 mm. pressure absolute. This example shows the results attained by conventional oxidation by treatment with nitric acid.

*Example 8*

316 grams (1 mol) of the low melting isomer of 9,10 dihydroxystearic acid was added gradually to 2000 grams of hot, 68% nitric acid with good agitation. The oxidation mixture was heated and stirred for one hour, cooled to 45° C. and an oil was separated. The nitric acid layer was vacuum distilled to dryness and the residue crystallized from 150 cc. of chloroform. 84.7 grams of white, crystalline dibasic acids were obtained. The dibasic acids had an acid number of 587; theory for azalaic acid is 596.

The chloroform filtrate was vacuum distilled and the residual oil combined with the previously separated supernatant oil. This combined oil was added gradually to a hot solution of 160 grams (4.0 m.) of sodium hydroxide dissolved in 600 cc. of water and heated and stirred at 80–85° C. for one hour. This alkaline solution was then reoxidized with 2000 grams of hot nitric acid for one hour, cooled to 45° C. and the supernatant oil was separated. The nitric acid was vacuum distilled, the residue crystallized from 300 cc. of hot water and the resulting solid recrystallized from 150 cc. of chloroform. 62.2 grams of a white, crystalline solid was obtained having an acid number of 605.

The chloroform filtrate from above was distilled to remove the solvent, the residual oil combined with the separated supernatant oil and the mixture was vacuum distilled. 58 grams of short-chained monobasic acids were obtained boiling at 140–56° C. at 34 mm. pressure absolute.

Example 9

200 grams of a commercial 12-hydroxystearic acid was gradually added to 2000 grams of hot nitric acid with good agitation and heated for two hours. A supernatant oil was separated and the nitric acid was vacuum distilled to dryness. The residue was crystallized from 400 cc. of benzene and 26 grams of white, crystalline dibasic acids obtained. These solids had an acid number of 489 while theory for equal proportions of $C_{11}$ and $C_{12}$ dibasic acids would constitute an acid number of 512.

The nitric acid distillate was extracted with three 100 cc. portions of benzene, the benzene extracts combined with the benzene filtrate from above and the solvent distilled. The previously separated oil was added to the residue and the mixture was vacuum distilled. 15.0 grams of short-chained monobasic acids boiling at 130–45° C. at 35 mm. were obtained.

Example 10

200 grams of a commercial 12-hydroxystearic acid was oxidized with 2000 grams of hot, 69% nitric acid for one hour with good agitation. A supernatant oil was separated and the nitric acid was vacuum distilled to dryness. The residue was crystallized from 400 cc. of benzene and 25.8 grams of a white, crystalline solid was obtained having an acid number of 545.

The nitric acid distillate was extracted three times with 100 cc. portions of benzene, the extracts combined with the above benzene filtrate and the solvent was distilled. The residual oil was combined with the separated supernatant oil and the mixture was added to a hot solution of 108 g. (2.7 m.) of sodium hydroxide dissolved in 425 cc. of water. The mixture was heated and stirred for one hour at 80–85° C. and then reoxidized with 2000 grams of nitric acid for one hour. 63.4 grams of a supernatant oil were separated and the nitric acid was vacuum distilled to dryness. The residue was crystallized from 300 cc. of water and the solid was recrystallized from 400 cc. of benzene. 60.1 grams of a white, crystalline solid was obtained, having an acid number of 448.

The nitric acid distillate was extracted with three 100 cc. portions of benzene, the extracts combined with the above benzene filtrate and the solvent was distilled. The residual oil was added to the 63.4 grams of separated oil and the mixture was vacuum distilled. 62.2 grams of short-chained monobasic acids were obtained boiling at 130–145° C. at 34 mm. pressure absolute.

Example 11

152 grams (1.0 mol) of camphor was added gradually to 2000 grams of hot 69% nitric acid with good agitation. The mixture was heated and stirred for eleven hours and then vacuum distilled to dryness. The residue was crystallized from 400 cc. of chloroform and 42 grams of white, crystalline solid was obtained. Its acid number was 475.

Example 12

152 grams (1.0 mol) of camphor (2-keto camphane) was added gradually to 2000 grams of hot nitric acid with good agitation and heated for ten hours. Nitric oxides were evolved. The material was vacuum distilled to dryness and the residue was crystallized from 400 cc. of chloroform. 42.8 grams of a white, crystalline solid was obtained, having an acid number of 490.

The nitric acid distillate was extracted with 4 100 cc. portions of chloroform, the extracts combined with the chloroform filtrate from above and the solvent was distilled. The residual oil was added to a hot solution of 50 grams (1.25 moles) of sodium hydroxide dissolved in 300 cc. of water and heated at 80–85° C. for one hour. This mixture was then reoxidized for one hour with 1500 grams of hot nitric acid with good agitation, the nitric acid was concentrated to dryness and the residue crystallized from 200 cc. of water. The resulting, oily solid was then crystallized from 200 cc. of chloroform and 22.4 grams of a white crystalline solid was obtained, having an acid number of 450.

Example 13

152 grams (1.0 mol) of camphor was dissolved in 500 cc. of acetic acid, heated to 80–90° C. and nitrogen oxides (from an oxidation as in Example 12) were passed in for five hours. The solution was vacuum distilled to dryness and the residue was recrystallized from 400 cc. of chloroform. 6.0 grams of a white, crystalline solid was obtained, having an acid number of 465.

The chloroform filtrate was distilled to remove the solvent and the residue was added to a hot solution of 60 grams (1.5 m.) of sodium hydroxide dissolved in 300 cc. of water and heated for one hour. The alkaline solution was then reoxidized with 1500 grams of hot nitric acid for one hour, the nitric acid was distilled under vacuum and the residue was crystallized from 200 cc. of water. The resulting oily solid was crystallized from 200 cc. of chloroform and 15 grams of white, crystalline solid was obtained, having an acid number of 495.

Example 14

The residual oils obtained after separation of the dibasic acids from an oxidation carried out according to Example 7 were vacuum distilled. 34 grams of a light-yellow, short-chained monobasic acid fraction was obtained, boiling at 138–160° C. at 34 mm. pressure absolute. An attempt to continue the distillation by increasing the still-pot temperature resulted in a sudden, vigorous exothermic reaction with the evolution of large quantities of gases which made it impossible to maintain a low pressure in the distillation apparatus. The residue on cooling was found to be a black, resinous, almost coke-like mass that was difficult to remove from the still-pot.

Example 15

The residual oils obtained after the separation of the second crop of dibasic acids from an oxidation carried out according to Example 8 were vacuum distilled. 58 grams of a light-colored, short-chained acid fraction were obtained boiling at 134–160° C. at 34 mm. pressure. Continued distillation gave additional distillate consisting of higher fatty acids. The residue was a dark brown, waxy mass that could be readily poured out of the still-pot or that could be dissolved by organic solvents, treated with absorbing earths or charcoals, filtered and the solvent distilled to give light colored, crystalline solids consisting of stearic acid, palmitic acid and other organic acids.

Example 16

Following the procedures outlined in Example 8, dibasic and monobasic acids may be obtained from the following materials:

(1) 10, 11 dihydroxystearic acid
(2) Terpene 1, 2 glycols and other 1, 2 glycols containing additional substituents such as
    (a) 9, 10 dihydroxystearonitrile
    (b) 9, 10 dihydroxystearamide
    (c) n-benzoyl 9, 10 dihydroxystearamine
(3) 12-hydroxystearic acid
(4) 9-hydroxystearic acid
(5) 10-hydroxystearic acid
(6) terpene alcohols and other alcohols containing other substituents such as
    (a) 12-hydroxystearamide
    (b) 12-hydroxystearyl chloride
(7) Ketonic aliphatic or cycloaliphatic compounds such as
    (a) 12-ketostearic acid
    (b) camphor
(8) Ketonic aliphatic and cycloaliphatic compounds containing other substituents such as
    (a) 12-ketostearamide
    (b) 12-ketostearonitrile

Example 17

Two hundred grams of commercial 12-hydroxystearic acid was added to 2000 grams of hot 70% nitric acid with good stirring and heating at 90–100° C. for one hour. An oil phase separated and the nitric acid phase was vacuum distilled to dryness. The residue was combined with the oil phase, diluted with 400 cc. of hot water, and the pH adjusted to 6.0–6.7 by the addition of sodium hydroxide solution. The resulting layers were separated, the aqueous phase acidified to pH 2.0 with a strong mineral acid, and the solid that was precipitated was filtered and dried. Its weight was 12.0 grams, and its acid number was 360.

The aqueous phase from above was treated with a calcium hydroxide solution, a solid separated, was filtered and dried. Acidification with a strong mineral acid gave a small yield of dibasic acids and other organic acids.

The organic layer from above was added to a solution of 108 grams of sodium hydroxide in 425 cc. of water, heated and stirred at 80° C. for an hour and then reoxidized by addition to 2000 grams of hot 70% nitric acid with good stirring. Heating and stirring was continued for two hours, the oil phase separated and the nitric acid layer vacuum distilled to dryness. The residue was combined with the oil phase, diluted with 400 cc. of hot water and the pH adjusted to 6.0 to 6.6 by the addition of an alkaline solution. The oil layer was removed, the aqueous phase acidified to pH 2.0 with hydrochloric acid, and the precipitated solid processed as previously described. Its weight was 67 grams and its acid number was 320.

The aqueous phase from above was treated with calcium hydroxide solution to isolate soluble organic acids as described before.

The organic phase was vacuum distilled to give 61 grams of short-chained monobasic acids. The residue was treated with 150 cc. of hot water, the pH adjusted to 6.7 and the oil layer removed. Acidification of the aqueous phase gave an additional yield of 4.9 grams of dibasic acids having an acid number of 354.

The organic phase was then extracted with hexane and the saturated monobasic acids were concentrated from the residual acids.

Thus the above examples show that my process is applicable generally to hydroxy- or keto-aliphatic compounds wherein at least one carbon atom bearing at least two hydrogen atoms is attached adjacent to the carbon atom bearing the hydroxy or ketonic oxygen group. These structures may be represented as:

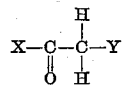

and

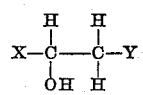

where X and Y are any radicals and may be alike or different. Thus the invention is applicable not only to dihydroxy aliphatic substances but is also applicable to monohydroxy aliphatic substances and ketonic aliphatic compounds. Furthermore, the pure substances need not be employed but either natural or synthetic mixtures of these hydroxy or ketonic substances may be employed.

Example 18

284 grams (1.0 mol) of stearic acid commercially known as Hystrene T70 was placed in a large test tube and heated to 160° C. 180 grams (2.0 mols) of 70% nitric acid was allowed to flow to the bottom of the test tube in droplets during two hours. The resulting material was then heated with a solution of 120 grams (3.0 mols) of sodium hydroxide dissolved in 400 cc. of water at 80–85° C. for three hours. This alkaline solution was oxidized with 1700 grams (20 mols) of 70% nitric acid containing 0.3 grams of ammonium metavanadate for six hours at 90–100° C. The solution was then cooled, the supernatant oil separated and the nitric acid solution vacuum distilled to dryness. The residue was crystallized from 300 cc. of water and 15 grams of dibasic acids were obtained. The acid number of the dibasic acid mixture was 700.

The separated oil was vacuum distilled at 5 mm. mercury and 10 grams of short-chained fatty acids boiling in the range equivalent to the boiling ranges of propionic to heptanoic acids were obtained. The acid number of the fatty acid product was 483.

Example 19

99 grams (0.5 mol) of tetradecane was heated to 160° C. in a large test tube and 180 grams (2.0 mols) of 70% nitric acid was added to the bottom of the test tube in droplets during three hours. The resulting material was added to 120 grams (3.0 mols) of sodium hydroxide dissolved in 400 cc. of water and heated to 80–85° C. for three hours. The alkaline mixture was reoxidized with 1700 grams (20.0 mols) of 70% nitric acid containing 0.3 gram of dissolved ammonium metavanadate for six hours at 90–100° C. with good stirring. The solution was then vacuum distilled to dryness, the solid was extracted and the organic matter crystallized from 300 cc. of benzene. The resulting solid was recrystallized from 300 cc. of water and 5.0 grams of dibasic acids were obtained. Its acid number was 642.

The benzene filtrate was distilled and 7 grams of short chain fatty acids boiling in the range equivalent to the boiling ranges of butyric to octanoic acids were obtained. The acid number of the fatty acids was 460.

Example 20

53 grams (0.5 mol) of ethyl benzene was placed in a bottle, the bottle and contents cooled and 23 grams (0.5 mol) of nitrogen dioxide was condensed into the bottle. The bottle was capped and allowed to stand for four days at 17–20° C. with occasional shaking. The contents were then stirred with a solution of 30 grams (0.75 mol) of sodium hydroxide dissolved in 200 cc. of water for three hours at 80–85° C. The alkaline phase thus formed was then separated and oxidized with 900 grams (10.0 mols) of 70% nitric acid at 95° C. for three hours. The solution was cooled and deposited 9.1 grams of acids having an acid number of 330.

The filtrate was vacuum concentrated to dryness and the residue crystallized from 200 cc. of water. 2.3 grams of acids were obtained, having an acid number of 426.9.

*Example 21*

53 grams (0.5 mol) of para-xylene were treated with 46 grams (1.0 mol) nitrogen dioxide as above. The product was added to 44 grams (1.1 mols) of sodium hydroxide dissolved in 300 cc. of water and heated and stirred at 80–90° C. for three hours. The undissolved organic layer amounted to 31.6 grams and was separated from the batch. The alkaline phase was oxidized with 900 grams (10.0 mols) of 70% nitric acid for four hours at 90–95° C. with good stirring. The solution was cooled to 0° C. and 7.3 grams of acids were isolated. The polybasic acid product had an acid number of 527.

The nitric acid filtrate was vacuum concentrated to dryness and the residue crystallized from 300 cc. of water. 2.4 grams of acids were isolated, having an acid number of 500.

*Example 22*

One hundred eighty-six (186) grams of beta-picoline was added to a mixture of 200 cc. of water and 270 grams of 70% nitric acid with good stirring, the solution evaporated under vacuum on a water bath and the residual liquid charged to a large test tube heated by an oil bath and fitted with a thermometer, a reflux condenser, a capillary addition tube running to the bottom of the test tube and attached at its upper end to a graduated dropping funnel. The picoline-salt solution was heated to 180° C. while 540 grams of 70% nitric acid was added slowly during four hours. The solution was then cooled, added to an excess of sodium hydroxide solution contained in a flask set up for distillation and the unreacted beta-picoline was distilled under vacuum. The distillate was then processed and gave 130 grams of beta-picoline.

The alkaline material remaining in the distilling flask was now reoxidized by adding it slowly to a well-stirred mixture of 2000 grams of 70% nitric acid containing 0.3 gram of ammonium metavanadate at 90–100° C. Heating and stirring was continued for three hours, the solution cooled somewhat and the excess of nitric acid vacuum distilled to dryness. The residual salt was now dissolved in 800 cc. of water, the solution treated with an excess of cupric sulfate and the pH of the mixture was adjusted carefully to about 6.0 by addition of dilute alkaline solutions. A greenish-blue precipitate was obtained, the precipitate filtered, washed with warm water and dried. 53.8 grams of the cupric salt of nicotinic acid was obtained that could be further processed as by treatment with strong hydrochloric acid, with hydrogen sulfide, etc., to isolate nicotinic acid or its salts.

*Example 23*

One hundred six (106) grams of para-xylene was charged to the above described apparatus that had been further modified by the inclusion of a water trap between the reflux condenser and the large test tube. The xylene was heated to 130–45° C. and 225 grams of 70% nitric acid was added through the capillary during one-half hour. Heating was continued for another hour, the product cooled somewhat and the product washed with sodium bicarbonate solution. The bicarbonate solution was separated and amounted to 862 grams. 200 grams of this solution was acidified to a pH of 2.0 with hydrochloric acid and gave a solid that was filtered and dried. The solid amounted to 9.0 grams and gave an acid number of 402. It had an indefinite melting point and appeared to be impure toluic acid. The brownish colored organic layer that was separated from the sodium bicarbonate solution was now extracted with 10% sodium hydroxide solution and partial solution of the organic matter occurred. The insoluble organic matter weighed 41.0 grams and was unreacted p-xylene substantially.

The remaining sodium bicarbonate solution amounted to 579 grams and it was mixed with a corresponding aliquot of the sodium hydroxide solution (i. e. with 116 grams of sodium hydroxide solution which was equivalent to 67% of the sodium hydroxide solution). This mixture was now reoxidized with 2000 grams of hot nitric acid containing 0.3 grams of dissolved ammonium metavanadate. The mixture was heated and stirred for three hours, cooled to 20° C. and a solid separated. The solid was washed, and dried and amounted to 52.1 grams. The solid was extracted with three 200 cc. portions of hot chloroform and 31.0 grams of white insoluble material remained that had an acid number of 660, and appeared to be terephthalic acid.

The chloroform filtrate was cooled and deposited a crop of solid acid. This was filtered and dried and amounted to 9.0 grams. Its acid number was 431 and its melting point was 174–176 degrees C.

The chloroform filtrate was distilled to dryness and a mixture of acids was obtained having a weight of 19.0 grams and an acid number of 390.

*Example 24*

One hundred (100) grams of stearic acid was placed in the apparatus described above and heated to 170° C. while 150 grams of 70% nitric acid was added through the capillary addition tube during one hour. The resulting reddish-yellow oil was added to a solution of 30 grams of sodium hydroxide dissolved in 400 cc. of water and heated and stirred at 80° C. for an hour. The resulting alkaline solution was now added to a well-stirred mixture of 1350 grams of 70% nitric acid containing 0.3 grams of ammonium metavanadate and heated at 90–100° C. for three hours. The resulting mixture was allowed to separate into a supernatant oil layer and a nitric acid layer, separated and the nitric acid layer was vacuum distilled to dryness. The residue was crystallized from 200 cc. of hot water, filtered to remove some oil and the water layer cooled. A white solid deposited was filtered and dried. Its weight was 9.2 grams and it had an acid number of 482.5.

The oil layer was dissolved in a solution of 34 grams of sodium hydroxide dissolved in 300 cc. of water, acidified carefully to a pH of about 6.5 and a fatty acid layer separated. This was removed, dried and 73.6 grams of light-brown fatty acids were obtained, having an acid number of 125.0.

The aqueous phase separated from above was acidified to pH 2.0 and a white solid layer precipitated. This was filtered and dried and amounted to 6.6 grams having an acid number of 500.

*Example 25*

One hundred three (103) grams of paraffin wax was charged to the apparatus described above and heated to 170° C. while 150 cc. of 70% nitric acid was added during two hours. The resulting material was washed with sodium bicarbonate solution, the mixture separated and the aqueous phase acidified to pH 2.0 with a strong mineral acid but gave only a small amount of liquid and solid acids.

The organic phase was now stirred with a solution of 40 grams of sodium hydroxide dissolved in 250 cc. of water and the alkaline phase reoxidized with 1350 grams of 70% nitric acid containing 0.3 grams of ammonium metavanadate at a temperature of 90–100° C. with good stirring for three hours. The solution was allowed to stand and separated into an organic top layer and a nitric acid layer. These layers were separated and the nitric acid layer was vacuum distilled to dryness. The residue was crystallized from 250 cc. of hot water and gave a solid on cooling. The solid was filtered and dried and weighed 4.2 grams. Its acid number was 286.0.

The organic layer was extracted with sodium bicarbonate solution and almost complete solution of the organic matter occurred. The layers were separated, the sodium bicarbonate phase was acidified to pH of 6.0 and a fatty acid layer separated. This was removed and dried and weighed 80 grams. Its acid number was 131.3.

The aqueous layer was acidified to pH 2.0 with hydrochloric acid and a white solid precipitated that was filtered and dried. It weighed 2.5 grams and had an acid number of 355.0.

*Example 26*

This example illustrates the process as applied to the recovery of pyridine from a mixture containing beta-picoline. One hundred and eighty-six grams of beta-picoline and seventy-nine grams of pyridine were mixed and added to a mixture of 400 cc. of water and 540 grams of 70% nitric acid with good stirring. The solution was evaporated under vacuum on a water bath and the residual liquid was charged to a large test tube heated by an oil bath and fitted with a thermometer, a reflux condenser, a capillary addition tube running to the bottom of the test tube and attached at the upper end to a graduated dropping funnel and a moisture trap. The pyridine and picoline salt solution was heated to 190° C. and 1080 grams of 70% nitric acid were added gradually during ten hours. The solution was then cooled, added to an excess of sodium hydroxide solution contained in a flask set up for distillation and the mixture was distilled almost to dryness. The distillate was saturated with sodium chloride, extracted with ether and the extracts distilled to give a recovery of 68 grams of pyridine.

*Example 27*

One hundred and six grams of para-xylene were mixed with 78 grams of benzene and then charged to the above described apparatus. The mixture was heated to its boiling point and 250 grams of 70% nitric acid were added gradually. Heating was continued for three hours, the product cooled somewhat and then added to an excess of sodium hydroxide solution. Partial solution of the organic matter occurred, the layers were separated and the organic phase distilled. Sixty-three grams of benzene were recovered.

*Example 28*

One hundred forty-one grams of commercial oleic acid was added slowly with good stirring to 990 grams of 70% nitric acid and heating and stirring continued for two hours. The resulting oil phase was then separated and the nitric acid phase was vacuum distilled to dryness. The residue and the oil phase were combined, diluted with 200 cc. of water and the pH of the mixture adjusted to 6.1 with 10% sodium hydroxide solution. The organic layer was carefully removed and the aqueous phase was acidified to pH of 2.0 with hydrochloric acid. A solid separated, was filtered and dried. It weighed 14.0 grams and had an acid number of 460.

The distilled nitric acid was extracted with benzene, the solvent removed and 5.0 grams of residual oil remained. This was combined with the organic phase and the mixture added to 80 grams of sodium hydroxide dissolved in 200 cc. of water, the product heated to 80° C. and stirred for one hour. This alkaline solution was then reoxidized by addition to 1125 grams of hot 70% nitric acid and heating and stirring continued for two and a half hours. The resulting phases were separated and the nitric acid portion vacuum distilled to dryness. The residue was combined with the oil phase, the mixture diluted with 200 cc. of water, the pH adjusted to 6.0, and the layers separated. The aqueous phase was acidified to pH 2.0 with a strong acid and a solid separated. It weighed 34 grams and had an acid number of 609.

The aqueous filtrate from above was adjusted to pH 10.0 with sodium hydroxide solution and 40 cc. of a saturated calcium chloride solution was added. The resulting precipitate was filtered and dried and weighed 6.2 grams. This material yielded short-chain organic acids on acidification with a mineral acid.

The organic layer separated as above was made alkaline by addition to a solution of 20 grams of sodium hydroxide in 200 cc. of water, heated to 80° C. for one hour with stirring and again reoxidized by addition to 800 grams of hot 70% nitric acid containing 0.2 grams of dissolved ammonium metavanadate. The mixture was heated and stirred for one hour, the oil layer separated and the nitric acid layer vacuum distilled to dryness. The residue was combined with the separated oil, diluted with 100 cc. of water and the pH adjusted to 6.0–6.5. The aqueous phase was separated and acidified to pH 2.0 and 14.4 grams of acids obtained, having an acid number of 500.

The water filtrate was again made alkaline and treated with calcium chloride solution to precipitate shorter chained dibasic acids as salts including some succinic acid.

The organic layer was vacuum distilled and 31 grams of short-chained monobasic acids were obtained. The residue was diluted with 100 cc. of hot water, the pH adjusted to 6.2, the layers separated, and the aqueous phase was acidified to pH 2.0 with a strong acid. A solid precipitated and was processed as heretofore. Its weight was 3.5 grams and its acid number was 520.

The organic phase from above was extracted with hexane and separated into two layers. The hexane layer contained appreciable amounts of stearic, palmitic, and other saturated acids. The other layer consisted of polymeric and oxidized acids.

*Example 29*

One hundred grams of low iodine number stearic acid was heated to 160–170° C. and 150 grams of 70% nitric acid was added through a capillary tube running to the bottom of the stearic acid container. The product was added to a solution of 30 grams of sodium hydroxide dissolved in 400 cc. of water and heated to 80° C. with stirring for one hour. The alkaline solution was then reoxidized by addition to 1350 grams of hot 70% nitric acid with good stirring, and heating and stirring continued for three hours. The oil phase was removed, the nitric acid layer vacuum distilled to dryness and the residue combined with the oil phase. The mixture was diluted with 300 cc. of hot water, the pH adjusted to 6.2 with sodium hydroxide solution and the organic layer removed. The aqueous phase was acidified to pH 2.0 with hydrochloric acid and 10.6 grams of solid obtained, having an acid number of 509.

The aqueous filtrate was neutralized, barium chloride solution added and the precipitate filtered. Acidification gave shorter chain organic acids.

The organic layer was vacuum distilled to give 10.0 grams of short-chained monobasic acids. The residue was diluted with 150 cc. of hot water, the pH adjusted to 6.0 and the aqueous phase separated, acidified to pH 2.0 and the solid processed as before. The solid weighed 1.2 grams and had an acid number of 459.

The organic layer could be extracted with hexane to remove the unoxidized stearic acid and the residual organic material could be again treated with alkali and reoxidized to give more dibasic acids.

*Example 30*

100 grams stearyl chloride (1-chloro octadecane) was heated to 160° C. in a large test tube and 180 grams (2 moles) of 70% nitric acid was added to the bottom of the test tube in droplets during the course of three hours while the heating was maintained by the means of an oil bath at 160° C. The resulting material was added to 120 grams (3 moles) of sodium hydroxide dissolved in 400 cc. of water and heated to 80–85° C. for three hours. This alkaline mixture was reoxidized with 1700 grams (20 moles) of 70% nitric acid containing 0.3 gram of dissolved ammonium metavanadate for six hours at 90–100° C. with good stirring. The solution was then vacuum distilled to dryness, the solid extracted with two 250 cc. portions of benzene and the organic solution extracted with sodium bicarbonate solution. The aqueous layer was separated, acidified to a pH of 2 with a strong mineral acid and a solid was precipitated which was filtered and dried. Its weight was 2.1 grams and the acid number was 405.

The organic layer was extracted with 10% sodium hydroxide solution, which was acidified and an organic layer separated. This was separated by extraction with ether, the ether solution was dried and distilled and organic layer amounting to 10 grams was obtained. This was a mixture of organic acids containing chlorine with an acid number of 125.

Example 31

100 grams of stearyl bromide (1 bromo octadecane) was heated to 160° C. in a large test tube and 180 grams (2 moles) of 70% nitric acid was added to the bottom of the test tube in droplets during the course of three hours while the heating was maintained by the means of an oil bath at 160° C. The resulting material was added to 120 grams (3 moles) of sodium hydroxide dissolved in 500 cc. of water and heated to 80–25° C. for three hours. This alkaline mixture was reoxidized with 1700 grams (20 moles) of 70% nitric acid containing 0.3 grams of dissolved ammonium metavanadate for six hours at 90–100° C. with good stirring. The solution was then vacuum distilled to dryness, the solid extracted with two 250 cc. portions of benzene and the organic solution extracted with sodium bicarbonate solution. The aqueous layer was separated, acidified to a pH of 2 with a strong mineral acid and a solid was precipitated which was filtered and dried. Its weight was 3.0 grams and the acid number was 395.

The organic layer was extracted with 10% sodium hydroxide solution, which was acidified with an organic layer separated. This was separated by extraction with ether, the ether solution was dried and distilled and organic layer amount to 10 grams was obtained. This mixture was of organic acids containing bromine with an acid number of 142.

Example 32

100 grams of octadecylnitrile was placed in a test tube, heated by an oil bath and the internal temperature was brought up to 170° C. 300 grams of 70% nitric acid was added slowly to the bottom of the test tube through a capillary tube during three hours. The resulting material was added to 120 grams (3 moles) of sodium hydroxide dissolved in 400 cc. of water and the mixture was heated to 80–85° C. for three hours. The alkaline material was reoxidized with 1700 grams (20 moles) 70% nitric acid containing 0.3 grams of dissolved ammonium metavanadate for six hours at 90–100° C. with good stirring. This solution was then vacuum distilled to dryness, the solid extracted with two 200 cc. portions of hot benzene and the benzene solutions combined.

The benzene solution was extracted with three 150 cc. of 15% sodium bicarbonate solution and bicarbonate solutions combined.

These solutions were acidified with a strong mineral acid to a pH of 2 and a solid precipitated. This was filtered and dried and three grams of dibasic acids with an acid number of 420 was obtained.

The benzene solutions were extracted with dilute sodium hydroxide solution and the aqueous solutions were acidified to a pH of 2 with a strong mineral acid. This solution was extracted with ether, the ether dried and distilled and a residual monobasic acid mixture was obtained, with an acid number of 135.

Example 33

100 grams of a chlorinated paraffin wax was placed in a large long test tube which was heated by means of an oil bath to a temperature of 170° C. 300 cc. of 70% nitric acid was now added in droplets through a capillary tube extending to the bottom of the test tube, during the course of three hours. The resulting material was dissolved in a mixture of hot benzene and washed with sodium bicarbonate solution. The aqueous layer was then separated and acidified to a pH of 2 with a strong mineral acid. This gave only a small amount of an acid.

The benzene solution was distilled to remove the solvent and the residue was stirred with a solution of 80 grams of sodium hydroxide, dissolved in 400 cc. of water, at a temperature of 80–85° C. for one hour. The alkaline phase was now reoxidized with 1350 grams of 70% nitric acid containing 0.3 gram of ammonium metavanadate at a temperature of 90–100° C. with good stirring for three hours. This mixture was distilled to dryness under vacuum from a water bath and the residue dissolved with hot benzene. The benzene solutions were combined and extracted with sodium bicarbonate solution. Acidification of the sodium bicarbonate solution with a strong mineral acid resulted in precipitation of a solid. This was filtered and dried. Three grams of chlorinated dibasic acids were obtained with an acid number of 302.

The benzene layers were extracted with several portions of 10% sodium hydroxide solution and the aqueous layers combined. These were acidified with a strong mineral acid to a pH of 6 and an organic phase separated. This was extracted with ether and benzene, the layers combined and the solvent distilled. The residue was a reddish-oily chlorinated acid mixture with an acid number of 110.

Example 34

100 grams of 1-phenyl butane was charged to a large test tube, attached to a water trap, surmounted by a reflux condenser. The large test tube was surrounded by an oil bath and the contents of the test tube was surrounded by an oil bath and the contents of the test tube were heated to 145° C. while 225 grams of 70% nitric acid was added through a capillary tube, extending to the bottom of the test tube during the course of 1½ hours. Heating was continued for another hour, the product cooled somewhat and dissolved in 200 cc. of benzene. The benzene solution was extracted with a solution of 60 grams of sodium hydroxide, dissolved in 400 cc. of water and the aqueous solution heated at 80–85° C. for one hour. This aqueous solution was now reoxidized with 2000 grams of hot 70% nitric acid, containing 0.3 grams of ammonium metavanadate. Heating and stirring was continued for three hours at 85–90° C. The mixture was distilled to dryness from an oil bath under vacuum and the residue was extracted with two 300 cc. portions of hot benzene. The benzene layers were combined and extracted with sodium bicarbonate solution. Acidification of the sodium bicarbonate solution gave 20 grams of a white solid acid which had the melting point of benzene acid.

The benzene solution was extracted with sodium carbonate solution which was then acidified with a strong mineral acid to a pH of 6. An organic layer separated and was extracted with ether. Distillation of the ether gave a residue amounting to 25 grams of a liquid acid with a boiling point in the range of acetic and propionic acid.

Example 35

100 grams of 1-phenyl hexane was charged to a large test tube, attached to a water trap, surmounted by a reflux condenser. The large test tube was surrounded by an oil bath and the contents of the test tube were heated to 145° C. while 225 grams of 70% nitric acid was added through a capillary tube, extending to the bottom of the test tube during the course of 1½ hours. Heating was continued for another hour, the product cooled somewhat and dissolved in 200 cc. of benzene. The benzene solution was extracted with a solution of 60 grams of sodium hydroxide, dissolved in 400 cc. of water and the aqueous solution heated at 80–85° C. for one hour. This aqueous solution was now reoxidized with 2000 grams of hot 70% nitric acid, containing 0.3 gram of ammonium metavanadate. Heating and stirring was continued for three hours at 85–90° C. The mixture was distilled to dryness from an oil bath under vacuum and the residue was extracted with two 300 cc. portions of hot benzene. The benzene layers were combined and extracted with sodium bicarbonate solution. Acidification of the sodium bicarbonate solution gave 20 grams of a white solid acid which had the melting point of benzoic acid.

The benzene solution was extracted with sodium carbonate solution which was then acidified with a strong mineral acid to a pH of 6. An organic layer separated and was extracted with ether. Distillation of the ether gave a residue amounting to 16 grams of a liquid acid with a boiling point in the range of acetic and propionic acid.

*Example 36*

300 grams of cyclohexane was charged to a large test tube surmounted by moisture trap with a reflux condenser and surrounded by an oil bath. The cyclohexane was heated to 135° C. and 325 grams of 70% nitric acid was added during the course of three hours through a capillary tube extending to the bottom of the test tube. Heating was continued for another two hours, the product cooled, diluted with 200 cc. of benzene and washed with dilute sodium bicarbonate solution. The sodium bicarbonate solution was acidified to a pH of 2 with hydrochloric acid and gave a solid that was filtered and dried. The solid amounted to four grams and was identified as adipic acid. The organic layer was extracted with 60 grams of sodium hydroxide solution dissolved in 300 cc. of water. The aqueous layer was stirred and heated to 90–95° C. for two hours. The aqueous layer was reoxidized with 2000 grams of hot nitric acid containing 0.3 grams of dissolved ammonium metavanadate. This mixture was heated and stirred for three hours. The mixture was then vacuum distilled to dryness from a water bath and a residue extracted with hot benzene. The benzene solution was extracted with sodium bicarbonate solution three times, the extracts combined and acidified with a strong mineral acid to a pH of 2. The white solid precipitated which was filtered and dried. The yield amounted to 25 grams and was identified as adipic acid by number, melting point and mixed melting point.

While the above examples show the oxidation of various specific organic compounds, the process is applicable generally to the oxidation of acyclic aliphatic, cycloaliphatic, alkyl-aryl, or alkyl-heterocyclic compounds having at least one carbon atom bearing at least three hydrogen atoms or having at least two adjacent carbon atoms bearing at least two hydrogen atoms on each carbon atom. Such chains may, for example, be saturated paraffin chains having a length of from 2 to 200 carbon atoms. The invention is applicable also to derivatives of the above substances such as dodecanenitrile, stearyl alcohol, naphthenic acids, and other substances meeting the above qualifications. Furthermore, the pure substances need not be employed but either natural or synthetic mixtures of these substances or their derivatives may be employed. Thus, Fischer-Tropsch hydrocarbons, kerosene, lubricating oil, paraffin wax, shale oil, hydrogenated shale oil, hydrogenated coal tar, hydrogenated kerosene, and similar substances may be employed.

The new process is applicable for oxidizing but not necessarily cleaving saturated aliphatic hydrocarbons such as the members of the alkane series characterized by the formula $C_nH_{2n+2}$ where $n$ ranges from 2 to above 200, preferably 4 to 30, including alkane or cycloaliphatic substances found in kerosene, lubricating oil, shale oil, coal tar and the like; the acids of such compounds which, for example, include butyric, valeric, caproic, heptoic, caprylic, nonylic, capric, undecylic, lauric, tridecylic, myristic, pentadecylic, palmitic, margaric, and stearic acids; and the alcohols which correspond to these acids as well as derivatives of the aliphatic and cycloaliphatic hydrocarbons, such as alcohols and the like. These saturated acids and alcohols have alkyl groups containing from 3 to 17 carbon atoms. Higher acids and alcohols of these series may also be cleaved in accordance with this invention. Also I have discovered that similarly advantageous results are attained by processing the corresponding cycloaliphatic hydrocarbons and cyclic acids and alcohols equivalent to the foregoing open-chain compounds, having the formula $C_nH_{2n}$, as well as the alkyl-substituted derivatives of these cycloaliphatic compounds, in accordance with this invention. Moreover the process of this invention is applicable to bicyclic saturated compounds such as decalin (decahydronaphthalene) ($C_nH_{2n-2}$) and the like.

The new process is applicable for oxidizing alkyl-heterocyclic and alkyl-aryl compounds which may or may not be cleaved as a result of the reaction. If the alkyl group attached to the ring has sufficient length it may be cleaved as well as oxidized, but this invention is equally applicable to alkyl heterocyclic compounds wherein the alkyl chain is too short to be cleaved. Even the methyl group is oxidized to form the corresponding acid in accordance with this process. The ring groups, such as those in toluene, xylenes, methyl naphthalene, methyl quinolines, substituted pyridines like methyl pyridine, beta-ethyl pyridine, alpha-picoline, beta-picoline, and gamma-picoline, are relatively inert to the action of very strong oxidizing agents and are not substantially cleaved.

In the separation procedures set forth above by way of example, separation was accomplished by regulated pH changes, by heavy metal precipitation and by alkane extraction. In the pH separation step, a pH of about 6.0 to 6.9 is necessary to dissolve dibasic acids and thereby separate them from the monobasic acids (or hydrocarbon layer), which may be removed by decantation, centrifuging or extraction. Generally decantation is satisfactory. The aqueous phase should be acidified to a pH of about 3.0 to 2.0 to effect precipitation of the dibasic acids. In the heavy metal precipitation step, this precipitation may be effected by the use of heavy metal hydroxides, bicarbonates, carbonates or by making the solution neutral or alkaline and then adding heavy metal salts. The applicable heavy metal salts include salts of calcium, barium, magnesium, lead and aluminum as well as salts of equivalent metals which react with dibasic acids to form insoluble salts of said dibasic acids. The dibasic acids may be recovered from the heavy metal salts by acidification with a strong acid, preferably one that gives a soluble salt of the heavy metal. In the alkane separation step, I have generally utilized hexane, but pentane, heptane, octane, nonane and other equivalent alkanes and other hydrocarbons are highly effective, provided they do not dissolve appreciable amounts of oxygenated, partially-oxidized hydrocarbons. These solvents are usually generally non-polar and may in some instances include compounds other than hydrocarbons.

The nitric acid that is preferably employed in the first or second stage of this process may be of 30–100% concentration although I prefer to use the commercial 68% acid because of its relative economy. The temperature during the oxidation may be varied from 30–250° C. with a temperature of 80–170° C. being preferable. Pressure may be used for oxidations carried out above the normal boiling points of the nitric acid reaction mixture or of the reactants. The molar ratio of nitric acid to the oxidized compound may be as low as 1:1 to as high as 100:1 during first and/or second oxidations. The use of oxidation catalysts consisting of salts of manganese, vanadium, copper or cobalt during the second step of the oxidation is desirable in many instances and serves to increase the oxidation rate.

The process of the invention is a definite advance in the technique of oxidation of acyclic aliphatic, cycloaliphatic, alkyl-aryl, or alkyl-heterocyclic compounds having at least one carbon atom bearing at least three hydrogen atoms or having at least two adjacent carbon atoms bearing at least two hydrogen atoms on each carbon atom. This invention has given improved yields, has materially decreased the time necessary for attainment of these results, has given more-color-stable mono and polybasic acids than heretofore obtained by nitric acid oxidation, and has given products than can be processed more simply than known heretofore. Furthermore, this invention greatly reduces the hazards and cost of processing the reaction mixture.

The process of this invention is a definite advance in the technique of oxidizing olefinic substances to acidic substances. This method has given improved yields, has materially decreased the time necessary for the attainment of these results, has decreased the amount of relatively worthless by-products drastically, has given more color-stable mono and polybasic acids than heretofore obtained by nitric acid oxidation and has given products than can be processed more simply than known heretofore. Another advantage is that this invention is applicable to polyolefins to give cleavage products in good yields despite the fact that it had been known heretofore that the nitric acid oxidation of polyolefins tends to give lower yields of cleavage products.

The invention is further advantageous in that a method is provided for separating unsaturated organic acids from saturated acids, or for removing such unsaturated acids from the saturated acids. For example, commercial oleic acid may comprise a mixture consisting by weight of approximately 75% oleic acid, 6-7% linoleic acid and linolenic acid and the balance saturated fatty acids consisting chiefly of palmitic and stearic acids. From such commercial mixture, oxidized and processed in accordance with this invention, is produced a mixture consisting essentially of unchanged palmitic, stearic and other saturated acids together with short-chain saturated acids such as nonylic acid and the like, and dibasic acids. By further processing in accordance with conventional procedures such as distillation, crystallization, extraction, low temperature crystallization, or a combination of these methods the nonylic acid and other short-chain monobasic acids as well as the dibasic acids are readily separated from the stearic and palmitic acids.

The invention is further advantageous in that it provides a method of separating unsaturated long-chain acids from saturated acids of approximately the same molecular weight, since the unsaturated acids are cleaved to form relatively short-chained monobasic and polybasic acids readily separable from the relatively inert saturated acids.

It will be appreciated that the initial nitric oxidizing step and the following treatment with alkali may be carried out continuously as well as batchwise and that various solvents or diluents may be used in carrying out these steps of the method.

While under certain conditions some of the nitrogen-containing organic matter may be left uncleaved after the alkali treatment and nitric acid oxidation, such matter may be isolated by extraction or the like and may be re-treated with alkali and reoxidized in accordance with this invention.

The process of this invention is a definite advance in the technique of oxidation of hydroxy or ketonic substances having at least one adjacent carbon atom carrying at least two hydrogen atoms. This method has given improved yields, has materially decreased the time necessary for attainment of these results, has given more color-stable mono and polybasic acids than heretofore obtained by nitric acid oxidation and has given products that can be processed more simply than known heretofore. Furthermore, this process greatly reduces the hazards and cost of processing the reaction mixture.

The reaction is further advantageous in that a method is provided for separating hydroxy or ketonic substances from hydrocarbons. For example, commercial 12-hydroxystearic acid may comprise a mixture consisting of 76% 12-hydroxystearic acid and 24% of stearic and palmitic acids. From such a commercial mixture, oxidized and processed in accordance with this invention is produced a mixture of essentially unchanged stearic and palmitic acid or other acids together with short-chained monobasic acids such as caproic acid (and the like), and dibasic acids. By further processing in accordance with conventional methods such as distillation, crystallization, low temperature crystallization, or a combination of these methods the caproic acids as well as the dibasic acids are readily separated from the stearic and palmitic acid.

The invention is further advantageous in that it provides a method of separating hydroxy or ketonic acids from saturated acids of approximately the same molecular weight, since the hydroxy or ketonic acids are cleaved to form relatively short-chained acids that are readily separable from the relatively inert, long-chained saturated acids.

The process is applicable to organic compounds having a pair of adjacent carbon atoms one of which carries a group selected from the class which consists of the hydroxy group and the ketone group, and particularly to 1,2 dihydroxy aliphatic or cycloaliphatic compounds having at least one alpha carbon atom bearing at least two hydrogen atoms; to hydroxy aliphatic or hydroxy cycloaliphatic compounds having at least one alpha carbon atom bearing at least two hydrogen atoms; and to keto aliphatic or keto cycloaliphatic compounds having at least one alpha carbon atom bearing at least two hydrogen atoms. Obviously the compound can bear more than one such grouping or a mixture of such groupings either with one another or with olefin groupings as in my aforementioned co-pending application to undergo multiple scission by my process.

It will be appreciated that, in accordance with this invention the steps of the process are readily practiced in either batch or continuous operations, and that solvents or diluents may be incorporated into the reaction liquids in carrying out these steps. It will also be understood that in certain instances some of the nitrogen-containing organic matter may remain uncleaved upon completion of the process described; such uncleaved matter may be isolated by extraction or otherwise, re-treated with alkali and reoxidized, preferably with a nitric oxidizing agent, to produce additional cleavage products.

The above description and examples are intended to be illustrative only. Any modification or variation therefrom which conforms to the spirit of the invention and which is obvious to one skilled in the chemical art once this invention has been revealed is intended to be included within the scope of my claims.

This application is a continuation in part of my co-pending applications Serial Nos. 217,896, 283,242 and 288,959, filed March 27, 1951, April 19, 1952 and May 20, 1952, respectively, and of the continuation application filed July 20, 1954, Serial No. 444,650.

Having thus described my invention, I claim:

1. In a method of producing acids from an organic carbon compound, said compound being selected from the group which consists of (1) the olefins wherein at least one of the olefinic carbon atoms carries a hydrogen atom, (2) the aliphatic and cycloaliphatic compounds having a pair of adjacent carbon atoms one of which carries a group selected from the class which consists of the hydroxy group and the ketonic oxygen group, and the other of which carries at least two hydrogen atoms, (3) the organic compounds selected from the group consisting of aliphatic and cycloaliphatic having a saturated paraffin chain having a chain length of from 2 to 200 carbon atoms and (4) the organic alkyl aromatic compounds wherein the alkyl group is attached to the ring, the steps which comprise contacting and reacting said organic compound with an oxidizing agent selected from the group consisting of nitric acid and the oxidizing nitric oxides, mixing alkali with the oxidation product, and then mixing the product with oxidizing agent in an acid medium, thereby oxidizing said material.

2. In a method of producing acids from an olefin wherein at least one of the olefinic carbon atoms carries a hydrogen atom, the steps which comprise contacting and reacting said olefin with an oxidizing agent selected from the group consisting of nitric acid and the oxidizing nitric oxides, mixing alkali with the oxidation product, and then mixing the product with oxidizing agent in an acid medium, thereby cleaving said material between said adjacent carbon atoms.

3. A method of producing acids from an organic compound selected from the group consisting of aliphatic and cycloaliphatic compounds, said compound having a pair of adjacent carbon atoms at least one of which carries a group selected from the class which consists of the hydroxy group and the ketonic oxygen group, and the other of which carries at least two hydrogen atoms comprising oxidizing said compound by contacting it with a nitric oxidizing agent, mixing alkali with the oxidation product to form an alkaline material, and then contacting and reacting the alkaline material with oxidizing agent in an acid medium, thereby effecting cleavage between said adjacent carbon atoms.

4. A method of producing carboxylic acid from an organic compound selected from the group consisting of aliphatic and cycloaliphatic which includes an alkyl group having a saturated paraffin chain having a chain length of from 2 to 200 carbon atoms, comprising oxidizing said chain by contacting it with a nitric oxidizing agent selected from the group consisting of nitric acid and the oxidizing nitric oxides, contacting and reacting the oxidation product with alkali, mixing the resulting material with strong acid, and mixing the acidified product with a strong oxidizing agent, comprising contacting and reacting said organic compound with a nitric oxidizing agent selected from the group consisting of nitric acid and the oxidizing nitric oxides and thereby oxidizing said compound, mixing alkali with the oxidation product to form an alkaline material, and contacting and reacting the alkaline material with an oxidizing agent in an acid medium thereby oxidizing said alkaline material forming a carboxylic acid.

5. In a method of producing acids from an olefin wherein at least one of the olefinic carbon atoms carries a hydrogen atom, the steps which comprise contacting and reacting said olefin with an oxidizing agent selected from the group consisting of nitric acid and the oxidizing nitric oxides, contacting and reacting the product with alkali, acidifying the resulting material, and reoxidizing the acidified product thereby cleaving the material between said adjacent carbon atoms.

6. In a method of producing acids from an olefin wherein at least one of the olefinic carbon atoms carries a hydrogen atom, the steps which comprise contacting and reacting said olefin with an oxidizing agent selected from the group consisting of nitric acid and the oxidizing nitric oxides, contacting and reacting the oxidation product with alkali, and mixing the resulting product with an oxidizing agent selected from the group consisting of nitric acid and the oxidizing nitric oxides thereby cleaving the material between said adjacent carbon atoms.

7. In a method of producing acids from an olefin wherein at least one of the olefinic carbon atoms carries a hydrogen atom, the steps which comprise contacting and reacting said olefin with an oxidizing agent selected from the group consisting of nitric acid and the oxidizing nitric oxides, contacting and reacting the oxidation product with alkali, acidifying the resulting material, adding a strong oxidizing agent and thereby reoxidizing the resulting product and cleaving this reoxidized material between said adjacent carbon atoms, and oxidizing the cleavage products by further contact with said oxidizing agent to form acids.

8. In a method of producing acidic cleavage products from a compound including a pair of singly bonded carbon atoms one of which carries an attached hydrogen atom and NO₂ group and the other of which carries an attached hydroxyl group, said compound being produced by reacting with nitric acid the compound which contains said carbon atoms, the steps which comprise adding alkali to the compound, mixing the resulting material with a strong oxidizing agent in an acid medium, and continuing this oxidation thereby cleaving the product between said adjacent carbon atoms.

9. A method of forming carboxylic oxidative cleavage products from an olefin wherein at least one of the olefinic carbon atoms carries a hydrogen atom comprising contacting and reacting an olefin batch with nitric acid thereby oxidizing the olefin and liberating gaseous nitric oxides, adding alkali to the oxidation product, reoxidizing the resulting material by contacting it in an acid medium with a strong oxidizing agent and thereby effecting carbon-carbon cleavage of said material, and conducting the liberated nitric oxides into another batch of olefin thereby oxidizing said other olefin.

10. A method of forming carboxylic oxidative cleavage products from an olefin wherein at least one of the olefinic carbon atoms carries a hydrogen atom comprising contacting and reacting an olefin batch with nitric acid thereby oxidizing the olefin and liberating gaseous nitric oxides, adding alkali to the oxidation product, reoxidizing the resulting material by contact with an oxidizing agent in acid medium and thereby effecting carbon-carbon cleavage of said material, conducting the liberated nitric oxides into another batch of olefin thereby oxidizing said other olefin, adding alkali to said other oxidized olefin, and reoxidizing in an acid medium the alkaline material thus obtained and thereby effecting carbon-carbon cleavage of said material.

11. A method of producing a monobasic acid and a dibasic acid from an olefin acid wherein at least one of the olefinic carbon atoms carries a hydrogen atom comprising contacting and reacting said olefin acid with nitric acid to oxidize and saturate said olefin, mixing the oxidized and nitrogen-containing product with caustic alkali, and contacting and reoxidizing the resulting product with nitric acid thereby cleaving it between adjacent carbon atoms and oxidizing the cleavage products.

12. In a method of producing acids from an olefin wherein at least one of the olefinic carbon atoms carries a hydrogen atom the steps which comprise oxidizing the olefinic double bond by contacting the olefin with an oxidizing agent selected from the group consisting of nitric acid and the oxidizing nitric oxides at about 20° C.–100° C. thereby producing a nitrogen containing fraction and a residual fraction, separating said fractions from one another, bringing the nitrogen containing fraction to about 20–100° C., adding the nitrogen containing fraction to excess strong caustic alkali, maintaining the resulting alkaline mixture at about 20–100° C., and mixing the resulting material with an oxidizing agent selected from the group consisting of nitric acid and the oxidizing nitric oxides.

13. The method defined in claim 12 wherein the oxidizing agent is nitric acid.

14. The method defined in claim 12 wherein the oxidizing agent is nitric oxide.

15. In a method of preparing carboxylic oxidation products from an olefin wherein at least one of the olefinic carbon atoms carries a hydrogen atom the steps which comprise oxidizing the olefin by treating it in an acid medium with the nitrate radical, treating the oxidation product with caustic alkali, and contacting and reoxidizing the resulting material with an oxidizing agent in an acid medium, thereby effecting carbon-carbon cleavage and producing an oxidation product having improved color stability.

16. A method of separating an olefinic substance from a mixture containing saturated organic compounds, said olefinic substance including olefinic carbon atoms at least one of which carries a hydrogen atom, comprising contacting the mixture with an oxidizing agent selected from the group consisting of nitric acid and the oxidizing nitric oxides, thereby oxidizing the olefin content of the mixture, reacting the product with alkali, reoxidizing the resulting material by contacting it with an acid oxidizing agent thereby cleaving the resulting reoxidation products between carbon atoms to form relatively low molecular weight acids, and separating said low molecular weight acids from the saturated organic compounds.

17. A method of producing acids from oleic acid comprising contacting and reacting said oleic acid with nitric acid and thereby oxidizing said oleic acid, mixing strong alkali metal hydroxide in excess with the oxidized product to form an alkaline material, and then contacting and reacting said alkaline material with nitric acid and thereby effecting a carbon-carbon cleavage thereof.

18. A method of producing acids from an organic compound selected from the group consisting of aliphatic and cycloaliphatic compounds, said compound having a pair of adjacent carbon atoms one of which carries a group selected from the class which consists of the hydroxy group and the ketonic oxygen group, and the other of which carries at least two hydrogen atoms comprising oxidizing said compound by contacting and reacting it with a nitric oxidizing agent selected from the class which consists of nitric acid and nitric oxides, reacting the oxidation product by contacting it with alkali acidifying the resulting material, and reoxidizing the resulting product by mixing it with an acidic oxidizing agent thereby effecting cleavage between said adjacent carbon atoms.

19. A method of producing acids from an organic compound selected from the group consisting of aliphatic and cycloaliphatic compounds, said compound having a pair of adjacent carbon atoms one of which carries a group selected from the class which consists of the hydroxy group and the ketonic oxygen group, and the other of which carries at least two hydrogen atoms comprising oxidizing said compound by contacting and reacting it with a nitric oxidizing agent selected from the class which consists of nitric acid and nitric oxides, reacting the oxidation product by contacting it with alkali, acidifying the resulting material, reoxidizing the resulting product by mixing it with an oxidizing agent in an acid medium thereby cleaving this reoxidized material.

20. A method of producing acids from an organic compound selected from the group consisting of aliphatic and cycloaliphatic compounds, said compound having a pair of adjacent carbon atoms one of which carries a group selected from the class which consists of the hydroxy group and the ketonic oxygen group, and the other of which carries at least two hydrogen atoms comprising oxidizing said compound by contacting and reacting it with a nitric oxidizing agent selected from the class which consists of nitric acid and nitric oxides, reacting the oxidation product by mixing it with alkali, acidifying the resulting material, reoxidizing the resulting product by mixing it with an oxidizing agent in an acid medium, thereby cleaving this reoxidized material, and oxidizing the cleavage products by continued contact with said oxidizing agent to form acids.

21. A method of producing acids from an organic compound selected from the group consisting of aliphatic and cycloaliphatic compounds, said compound having a pair of adjacent carbon atoms one of which carries a group selected from the class which consists of the hydroxy group and the ketonic oxygen group, and the other of which carries at least two hydrogen atoms comprising contacting and reacting a batch of such compound with nitric acid thereby oxidizing the compound and liberating a gaseous nitrogen oxide, adding alkali to the oxidation product, reoxidizing the alkaline material by mixing it with an oxidizing agent in an acid medium thereby cleaving said organic compound between said adjacent carbon atoms, and conducting the liberated oxide into another batch of said organic compound thereby oxidizing said compound.

22. A method of producing oxidative cleavage products from an organic compound selected from the group consisting of aliphatic and cycloaliphatic compounds, said compound having a pair of adjacent carbon atoms one of which carries a group selected from the class which consists of the hydroxy group and the ketonic oxygen group, and the other of which carries at least two hydrogen atoms, comprising oxidizing said compound by contacting and reacting it with nitric acid thereby liberating gaseous nitric oxide, adding alkali to the oxidation product, reoxidizing the alkaline material by mixing it with an oxidizing agent in an acid medium, conducting the liberated nitric oxide into another batch of said aliphatic organic compound thereby oxidizing said other batch, adding alkali to said other batch, and reoxidizing the alkaline product thus obtained.

23. A method of producing acids selected from the group consisting of monobasic acids and dibasic acids from an organic compound selected from the group consisting of aliphatic and cycloaliphatic compounds, said compound having a pair of adjacent carbon atoms each of which carries a group selected from the class which consists of the hydroxy group and the ketonic oxygen group, and at least one of which is attached to another carbon atom which carries at least two hydrogen groups, comprising mixing and reacting said compound with nitric acid to oxidize said compound, mixing the oxidized and nitrogen-containing product with caustic alkali, reoxidizing the product by mixing it with an oxidizing agent in an acid medium thereby cleaving said compound between said adjacent carbon atoms, and oxidizing the cleavage products by continued contact with said oxidizing agent in said acid medium.

24. A method of producing acids from an organic compound selected from the group consisting of aliphatic and cycloaliphatic compounds, said compound having a pair of adjacent carbon atoms one of which carries a group selected from the class which consists of the hydroxy group and the ketonic oxygen group, and the other of which carries at least two hydrogen atoms comprising oxidizing said compound by contacting it with a nitric oxidizing agent at 10° C.–150° C. thereby producing a nitrogen-containing fraction and a residual fraction, bringing the nitrogen-containing fraction to 10–150° C., introducing the nitrogen-containing fraction into excess strong caustic alkali, maintaining this mixture alkaline at 10–150° C., acidifying the alkaline mixture, and reoxidizing the resulting material by mixing it with a strong oxidizing agent.

25. A method of producing acids from an organic compound selected from the group consisting of aliphatic and cycloaliphatic compounds, said compound having a pair of adjacent carbon atoms one of which carries a group selected from the class which consists of the hydroxy group and the ketonic oxygen group, and the other of which carries at least two hydrogen atoms comprising oxidizing said compound by mixing it with a nitric oxidizing agent at 10° C.–150° C. thereby producing a nitrogen-containing fraction and a residual fraction, separating the nitrogen-containing fraction from the residual fraction, bringing the nitrogen containing fraction to 10–150° C., introducing the nitrogen-containing fraction into excess strong caustic alkali, maintaining this mixture alkaline at 10–150° C., acidifying the alkaline mixture, and reoxidizing the resulting material by mixing it with a strong oxidizing agent.

26. The invention as defined in claim 24 wherein the nitric oxidizing agent is nitric acid.

27. The invention as defined in claim 24 wherein the nitric oxidizing agent is a nitric oxide.

28. In a method of producing acids from an organic compound selected from the group consisting of aliphatic and cycloaliphatic compounds, said compound having a pair of adjacent carbon atoms, one of which carries a group selected from the class which consists of the hydroxy group and the ketonic oxygen group and the other of which carries at least two hydrogen atoms by treatment with a nitric oxidizing agent, the steps which comprise treating the nitric oxidation product by mixing it with caustic alkali, and treating the resulting material by mixing with an acidic oxidizing substance, thereby producing an oxidation product having improved color stability.

29. A method of separating from hydrocarbons an organic compound selected from the group consisting of aliphatic and cycloaliphatic compounds, said compound having a pair of adjacent carbon atoms one of which carries a group selected from the class which consists of the hydroxy group and the ketonic oxygen group and the other of which carries at least two hydrogen atoms, comprising reacting the mixture by mixing it with a nitric oxidizing agent, thereby oxidizing said hydroxy and ketone groups, reacting the product by mixing it with alkali, reoxidizing the resulting material by mixing it with a strong oxidizing agent in an acid medium, cleaving the resulting reoxidation products between said adjacent carbon atoms by continued contact with said oxidizing agent to form relatively low molecular weight acids, and separating said low molecular acids from said other hydrocarbons.

30. A method of processing nitric oxidation products with optimum simplicity and minimum hazard, said nitric oxidation products being the product of reaction of a nitric oxidizing agent with an organic compound selected from the group consisting of aliphatic and cycloaliphatic compounds, said compound having a pair of adjacent carbon atoms one of which carries a group selected from the class which consists of the hydroxy group and the ketonic oxygen group, and the other of which carries at least two hydrogen atoms, comprising contacting and reacting said nitric oxidation products with alkali, acidifying the product by mixing it with a strong acid, and mixing the acidified product with a strong oxidizing agent.

31. The method defined in claim 3 further characterized by the fact that the oxidation of the alkaline material is carried out in the presence of a metal salt catalyst.

32. The method of producing acids from 9,10-dihydroxy stearic acid comprising contacting and reacting said 9,10-dihydroxy stearic acid with nitric acid and thereby oxidizing said 9,10-dihydroxy stearic acid, mixing strong alkali metal hydroxide in excess with the oxidized product to form an alkaline material, and then contacting and reacting said alkaline material with nitric acid and thereby effecting a carbon-carbon cleavage thereof.

33. A method of producing carboxylic acid from an organic compound selected from the group consisting of aliphatic and cycloaliphatic which includes a saturated paraffin chain having a chain length of from 2 to 200 carbon atoms, comprising oxidizing said chain by contacting and reacting it with a nitric oxidizing agent selected from the group consisting of nitric acid and the oxidizing nitric oxides, contacting and reacting the oxidation product with alkali, mixing the resulting material with strong acid, and mixing the acidfied product with a strong oxdizing agent.

34. A method of producing carboxylic acids from an organic compound selected from the group consisting of aliphatic and cycloaliphatic which includes a saturated paraffin chain having a chain length of 2 to 200 carbon atoms, comprising oxidizing said chain by contacting and reacting it with a nitric oxidizing agent selected from the class which consists of nitric acid and nitric oxides, contacting and reacting the oxidation product with alkali, adding acid to the resulting material, reoxidizing the resulting product by contacting it in an acid medium with an oxidizing agent, and cleaving this reoxidized material.

35. A method of producing carboxylic acids from an organic compound selected from the group consisting of aliphatic and cycloaliphatic comprising a saturated paraffin chain having a chain length of from 2 to 200 carbon atoms, comprising oxidizing said chain by contacting and reacting it with a nitric oxidizing agent selected from the class which consists of nitric acid and nitric oxides, contacting and reacting the oxidation product with alkali, acidifying the resulting material by adding an acid thereto, reoxidizing the resulting product by the addition of oxidizing agent, thereby cleaving this reoxidized material, and continuing the condition of oxidizing agent thereby oxidizing the cleavage products to form acids.

36. A method of preparing carboxylic acid from an organic compound selected from the group consisting of aliphatic and cycloaliphatic including a saturated paraffin chain having a chain length of from 2 to 200 carbon atoms and having adjacent carbon atoms a first one of which bears zero to three hydrogen atoms and the other of which bears two to three hydrogen atoms, said other carbon atom bearing three hydrogen atoms when said first carbon atom bears less than two hydrogen atoms, comprising oxidizing said saturated chain by contacting it with a nitric oxidizing agent selected from the group consisting of nitric acid and the oxidizing nitric oxides, at about 30–200° C. for up to about 20 hours thereby producing a nitrogen containing fraction and a residual fraction, separating the nitrogen containing fraction from the residual fraction, bringing the nitrogen containing fraction to 30–200 C., introducing excess strong caustic alkali into the nitrogen containing fraction, maintaining this alkaline mixture at 20–100° C., acidifying the alkaline mixture, and oxidizing the resulting material with a nitric oxidizing agent selected from the group consisting of nitric acid and the oxidizing nitric oxides.

37. In a method of preparing carboxylic acids from an organic compound selected from the group consisting of aliphatic and cycloaliphatic having a saturated paraffin chain having from 4 to 30 carbon atoms which has been oxidized by treatment with a nitric oxidizing agent selected from the group consisting of nitric acid and the oxidizing nitric oxides, the steps which comprise mixing the nitrogen containing oxidation product with caustic alkali, and reoxidizing the resulting material by mixing it with an oxidizing agent in an acid medium, thereby producing an oxidation product having improved color stability.

38. A method of preparing a readily-oxidized intermediate from an organic compound selected from the group consisting of aliphatic and cycloaliphatic including a saturated paraffin chain having a chain length of about 2 to 200 carbon atoms, comprising oxidizing said chain by contacting and reacting it with a nitric oxidizing agent selected from the group consisting of nitric acid and the oxidizing nitric oxides, contacting and reacting the oxidation product with alkali, mixing the resulting material with strong acid, and mixing the acidified product with a strong oxidizing agent.

39. A method of preparing organic acids from a saturated fatty acid having from 3 to 17 carbon atoms comprising contacting and reacting said fatty acid with a nitric oxidizing agent selected from the group consisting of nitric acid and the oxidizing nitrogen oxides, adding alkali to the product, and oxidizing the resulting material by contacting it with an oxidizing agent in an acid medium.

40. The method defined in claim 39 wherein the fatty acid is stearic acid and the nitric oxidizing agent is nitric acid.

41. A method of preparing a plurality of organic carboxylic acids from an aliphatic hydrocarbon having a saturated paraffin chain of the formula $C_nH_{2n}+2$ where $n$ is in the range of 2 to 200, comprising oxidizing said chain by contacting it with a nitric oxidizing agent selected from the group consisting of nitric acid and the oxidizing nitric oxides, contacting and reacting the oxidation product with alkali, mixing the resulting material with strong acid, and mixing the acidified product with a strong oxidizing agent, comprising contacting and reacting said saturated hydrocarbon with a nitric oxidizing agent selected from the group consisting of nitric acid and the oxidizing nitrogen oxides, adding alkali to the product, and oxidizing the resulting material by contacting it with a nitric oxidizing agent selected from the group consisting of nitric acid and the oxidizing nitric oxides.

42. The method of preparing carboxylic acids from tetradecane comprising contacting and reacting said tetradecane with nitric acid and thereby oxidizing said tetradecane, mixing strong alkali metal hydroxide in excess with the oxidized product to form an alkaline material, and then contacting and reacting said alkaline material with nitric acid thereby effecting a carbon-carbon cleavage thereof.

43. A method of producing carboxylic acid from an organic alkyl aromatic compound wherein the alkyl group is attached to the ring, said compound being oxidizable by a nitric oxidizing agent selected from the group consisting of nitric acid and the nitric oxides, the steps comprising contacting and reacting said alkyl aromatic compound with said agent thereby oxidizing said compound, mixing alkali with the oxidation product to form an alkaline material, and contacting and reacting the alkaline material with an oxidizing agent in an acid medium thereby oxidizing said alkaline material forming a carboxylic acid.

44. The method defined in claim 43 wherein the alkyl aromatic compound is alkyl benzene.

45. The method defined in claim 43 wherein the alkyl aromatic compound is ethyl benzene.

46. The method defined in claim 43 wherein the alkyl aromatic compound is para-xylene.

References Cited in the file of this patent

UNITED STATES PATENTS

| Number | Name | Date |
|---|---|---|
| 1,721,958 | James | July 23, 1929 |
| 1,945,246 | Witzel | Jan. 30, 1934 |
| 2,203,680 | Ellingboe | June 11, 1940 |
| 2,298,387 | Kenyon et al. | Oct. 13, 1942 |
| 2,312,468 | Ebel et al. | Mar. 2, 1943 |
| 2,394,650 | Zimmerli | Feb. 12, 1946 |
| 2,409,345 | Dean | Oct. 15, 1946 |
| 2,522,163 | Cislak et al. | Sept. 12, 1950 |
| 2,524,957 | Burrown et al. | Oct. 10, 1950 |
| 2,662,908 | Logan | Dec. 15, 1953 |